US008462862B2

(12) United States Patent
Wang

(10) Patent No.: US 8,462,862 B2
(45) Date of Patent: Jun. 11, 2013

(54) SYMBOL TIMING METHODS AND APPARATUSES USING THE SAME IN MULTI-CARRIER RECEIVING SYSTEMS

(75) Inventor: Hung-Hsiang Wang, Zhudong Township (TW)

(73) Assignee: Industrial Technology Research Institute, Chutung (TW)

( * ) Notice: Subject to any disclaimer, the term of this patent is extended or adjusted under 35 U.S.C. 154(b) by 754 days.

(21) Appl. No.: 12/708,528

(22) Filed: Feb. 18, 2010

(65) Prior Publication Data

US 2011/0164708 A1 Jul. 7, 2011

(30) Foreign Application Priority Data

Jan. 4, 2010 (TW) ................................ 99100008 A

(51) Int. Cl.
*H04L 27/28* (2006.01)
*H04B 1/00* (2006.01)

(52) U.S. Cl.
USPC .......................................... 375/260; 370/130

(58) Field of Classification Search
USPC .................... 375/260, 130, 343; 348/473, 564
See application file for complete search history.

(56) References Cited

U.S. PATENT DOCUMENTS 6,459,745 B1 * 10/2002 Moose et al. .................. 375/355
2005/0163262 A1 * 7/2005 Gupta ............................ 375/343

FOREIGN PATENT DOCUMENTS

TW  200709624 A  3/2007
TW  200735600 A  9/2007

OTHER PUBLICATIONS

Office Action of corresponding TW application, issued on Mar. 28, 2013.

* cited by examiner

*Primary Examiner* — Khai Tran
(74) *Attorney, Agent, or Firm* — Wang Law Firm, Inc.; Li K. Wang; Stephen Hsu

(57) ABSTRACT

A symbol timing method for a multi-carrier system is provided, including: receiving an input symbol; executing a correlation operation by using a first summation window with a size smaller than a duplicated data to generate a first characteristic signal; determining a first search region according to a first predetermined threshold and the first characteristic signal and searching a local peak value in the first search region; locating a right edge point of the first characteristic signal according to a difference value and the local peak value; obtaining a coarse symbol timing position for a following input symbol according to a predetermined movement and the right edge point; and outputting the coarse symbol timing position to a signal transformation module, wherein signal transformation is executed by the signal transformation module according to the coarse symbol timing position.

24 Claims, 8 Drawing Sheets

SYMBOL TIMING METHODS AND APPARATUSES USING THE SAME IN MULTI-CARRIER RECEIVING SYSTEMS

CROSS REFERENCE TO RELATED APPLICATIONS

This Application claims priority of Taiwan Patent Application No. 099100008 filed on Jan. 4, 2010, the entirety of which is incorporated by reference herein.

BACKGROUND OF THE APPLICATION

1. Technical Field

The application relates to symbol timing methods, and more particularly, to symbol timing methods and apparatuses using the same, applied in multi-carrier receiving systems.

2. Related Art

A wireless communication system and a broadcast system are capable of transmitting information signals by a transmitter to a receiver via physical channels such as through air or by other interfaces. Due to non-ideal channel effect, such as multipath fading and reflection, the received signal usually has signal distortion. Orthogonal frequency division multiplexing schemes based on multi-carrier modulation may decrease multi-path fading and reflection. Recently, the application of a wire/wireless communication system and a broadcast system has become popularized. For example, Asymmetric Digital Subscriber Line (ADSL), Very-high-speed Digital Subscriber Line (VDSL), Digital Audio Broadcasting (DAB), Wireless Local Area Network (WLAN), 802.11a/g/n, Ultra Wideband (UWB), wireless communication system, Dedicated Short Range Communications (DSRC), Integrated Services Digital Broadcasting-Terrestrial (ISDB-T), Digital Video Broadcasting-Terrestrial/Handheld (DVB-T/H) and China Mobile Multimedia Broadcasting (CMMB) or other standards all adopt orthogonal frequency division multiplexing scheme.

FIG. 1 is a schematic diagram illustrating an orthogonal frequency division multiplexing symbol. In an orthogonal frequency division multiplexing symbol, a duplicated data is a copied section from the end of the symbol, and the duplicated data starts at the beginning of the symbol. The purpose of the duplicated data is to protect the orthogonal frequency division multiplexing symbol from inter-symbol interference (ISI) generated by multi-path fading and reflection in the channels. The duplicated data is also defined as a cyclic prefix (CP) or a guard interval (GI) and the length of guard interval is also defined as a GIL. For example, there are three choices for the number of carriers known as 2K-mode, 4K-mode and 8K-mode in a Digital Video Broadcasting Terrestrial/Handheld (DVB-T/H) and one of the 2K-mode, 4K-mode and 8K-mode respectively associates with four different kinds of the guard intervals. For example, the guard interval can be ½₃₂, ⅟₁₆, ⅛ or ¼ the length of a symbol. Normally, the length of the guard interval is larger than the longest length of the delay path in the multi-path fading and reflection of the channels.

The duplicated data may be used in the receiver to process the received signal such as a coarse symbol timing estimation and the carrier frequency offset estimation and so forth. A channel impulse response of the first channel may be selected for the coarse symbol timing procedure, but it is not the most powerful channel impulse response. Thus, a filter for a channel estimation module can include all the channel impulse responses of the channels for correct estimation of the coarse symbol timing procedure.

Note that the guard interval which is affected by the inter-symbol interference should be removed from the starting of the orthogonal frequency division multiplexing symbol before the receiver processes the signal. A correct coarse symbol timing position enables the Fast Fourier Transform (FFT) window timing correct. If the Fast Fourier Transform (FFT) window timing is not correct, the phase difference noise will be introduced. In slight degree the time will be prolonged to get the correct coarse symbol timing, but in serious degree the resolution of all the following data can not be correctly gotten.

BRIEF SUMMARY OF THE APPLICATION

One aspect of the present application is to provide a symbol timing method for a multi-carrier system comprising: receiving an input symbol; executing a correlation operation by using a first summation window with a size smaller than a duplicated data to generate a first characteristic signal; determining a first search region according to a first predetermined threshold and the first characteristic signal; searching a local peak value in the first search region; locating a right edge point of the first characteristic signal according to a difference value and the local peak value; obtaining a coarse symbol timing position for a following input symbol according to a predetermined movement and the right edge point; and outputting the coarse symbol timing position to a signal transformation module, wherein signal transformation is executed by the signal transformation module according to the coarse symbol timing position.

Another aspect of the present application is to provide a receiver for a multi-carrier system comprising: a signal arrangement device for receiving and processing an Orthogonal Frequency Division Multiplexing (OFDM) symbol to generate an input symbol; a coarse symbol timing module for executing a correlation operation by using a first summation window with a size smaller than a duplicated data to generate a first characteristic signal; determining a right edge point of the first characteristic signal according to a first predetermined threshold, a difference value and the first characteristic signal, and locating a coarse symbol timing position for a following input symbol according to a predetermined movement and the right edge point; and a signal transformation module for executing signal transformation according to the coarse symbol timing position.

The advantage and spirit of the application could be better understood by the following recitations together with the appended drawings.

BRIEF DESCRIPTION OF DRAWINGS

The application can be more fully understood by reading the subsequent detailed description and examples with references made to the accompanying drawings, wherein:

FIG. 4-1 illustrates a schematic diagram of a magnitude characteristic signal generated by using a summation window with a size smaller than a duplicated data to execute a correlation operation in a short channel according to an embodiment of the present application.

FIG. 4-2 illustrates a schematic diagram of a magnitude characteristic signal generated by using a summation window with a size smaller than a duplicated data to execute a correlation operation in a long channel according to an embodiment of the present application.

DETAILED DESCRIPTION

The following description could be a contemplated mode of carrying out the application. This description is made for the purpose of illustrating the general principles of the application and should not be taken in a limiting sense. The scope of the application is best determined by reference to the appended claims.

Figure 1:
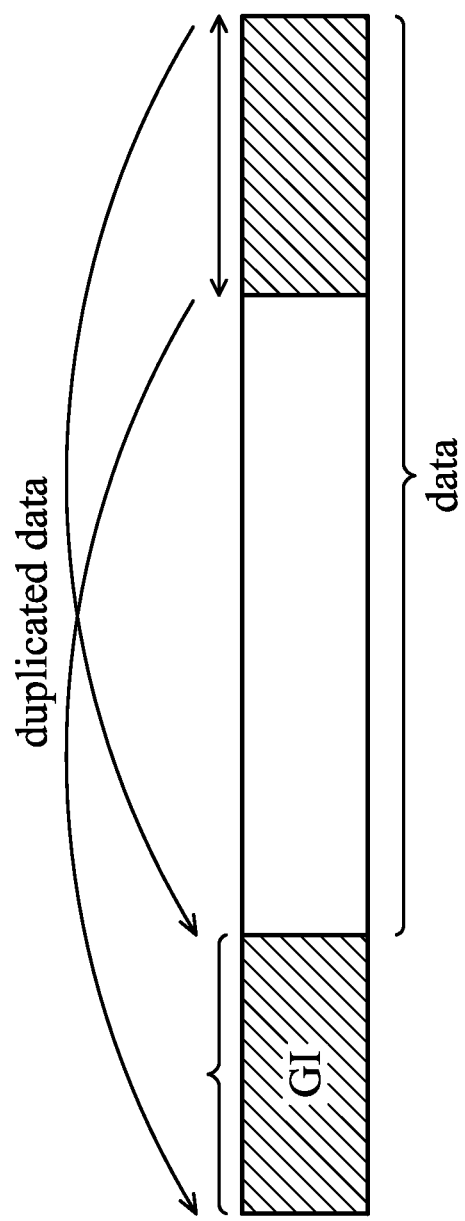
FIG. 1 is a schematic diagram illustrating an orthogonal frequency division multiplexing symbol.
Figure 2:
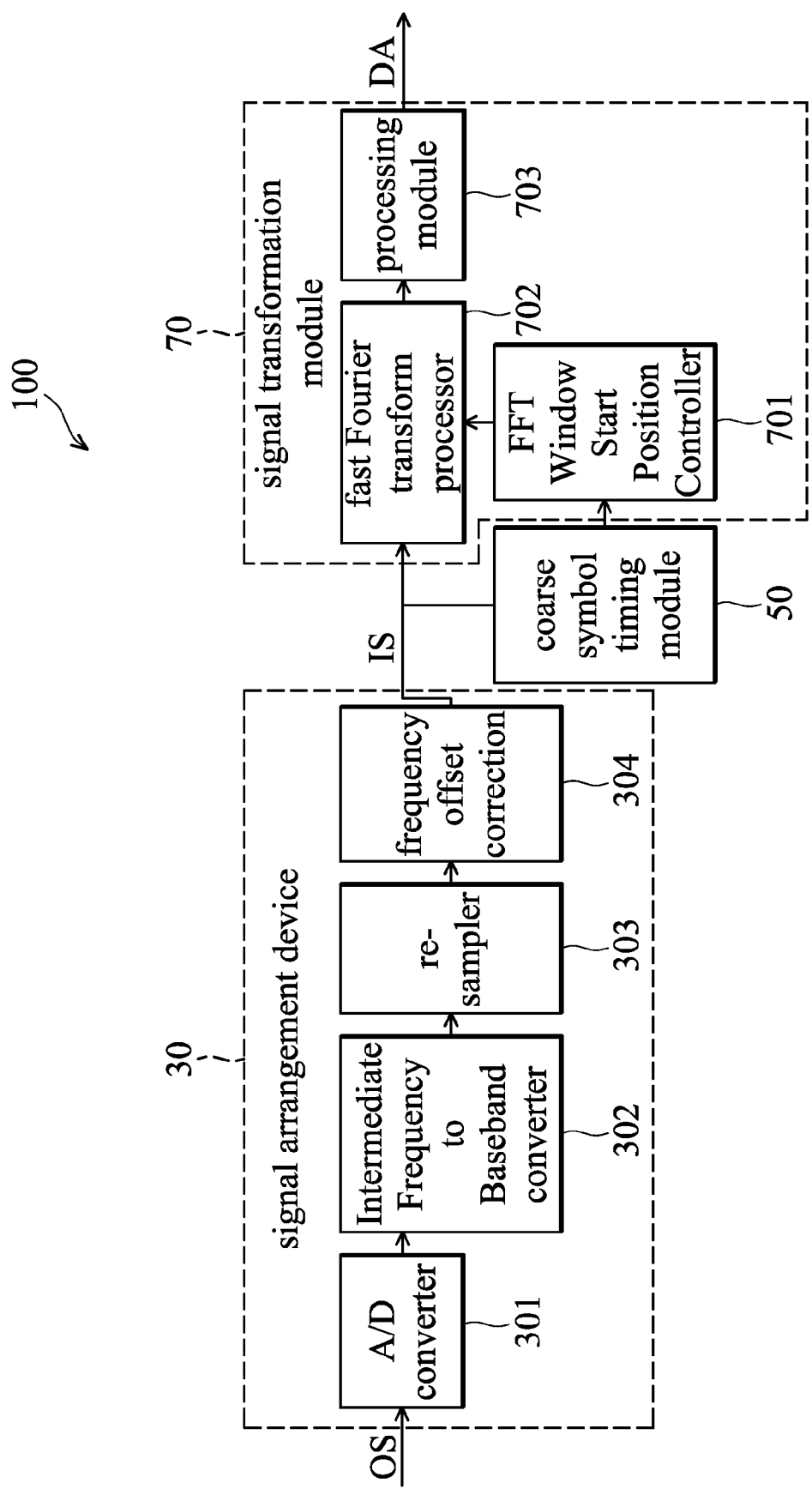
FIG. 2 is a block diagram illustrating a receiver 100 for an Orthogonal Frequency Division Multiplexing (OFDM) system according to an embodiment of the present application.

FIG. 2 is a block diagram illustrating a receiver 100 for an Orthogonal Frequency Division Multiplexing (OFDM) system according to an embodiment of the present application. The receiver 100 may include a signal arrangement device 30 for receiving the Orthogonal Frequency Division Multiplexing (OFDM) signal "OS" which includes a plurality of Orthogonal Frequency Division Multiplexing (OFDM) symbols. The signal arrangement device 30 processes the received Orthogonal Frequency Division Multiplexing (OFDM) symbols to generate a plurality of input symbols, wherein the signal arrangement device 30 may include an A/D converter 301, an Intermediate Frequency to Baseband converter 302, a re-sampler 303 and a frequency offset correction 304. The A/D converter 301 transforms the received Orthogonal Frequency Division Multiplexing (OFDM) symbols from the analogy signal to the Digital Signal. The intermediate frequency signal is down converted to the baseband where the signal is processed within frequency range by the Intermediate Frequency to Baseband converter 302. The re-sampler 303 re-samples the baseband signal. The frequency offset correction 304 corrects the frequency offset to avoid the effect of inter-carrier interference (ICI), and outputs the input symbols, wherein the input symbols are shown as "IS" in the FIG. 2. The receiver 100 further includes a coarse symbol timing module 50. The coarse symbol timing module 50 receives the input symbols and executes a correlation operation by using a summation window with a size smaller than a duplicated data such as a cyclic prefix (CP) or guard interval (GI) shown in the FIG. 1 to generate a characteristic signal and then determines a position of a right edge point in the characteristic signal according to a predetermined threshold, a difference value and the characteristic signal generated by the correlation operation or determines a position of a left edge point in the characteristic signal according to a predetermined threshold and the characteristic signal generated by the correlation operation. The coarse symbol timing module 50 then finds a coarse symbol timing position for a following input symbol according to the right/left edge point and the respective predetermined movement corresponding to the right/left edge point. A signal transformation module 70 in the receiver 100 executes signal transformation to obtain original data transmitted by a transmitter according to the obtained coarse symbol timing position and the input symbols. The signal transformation module 70 may include a FFT Window Start Position Controller 701, a fast Fourier transform processor 702 and a processing module 703. The FFT Window Start Position Controller 701 controls a fast Fourier transform (FFT) window start position according to the searched coarse symbol timing position by the coarse symbol timing module 50. The fast Fourier transform processor 702 transforms the signal from the frequency domain to the time domain. The processing module 703 obtains original data "DA" transmitted by a transmitter according to the processed signal via the fast. Fourier transform processor 702.

Figure 3:
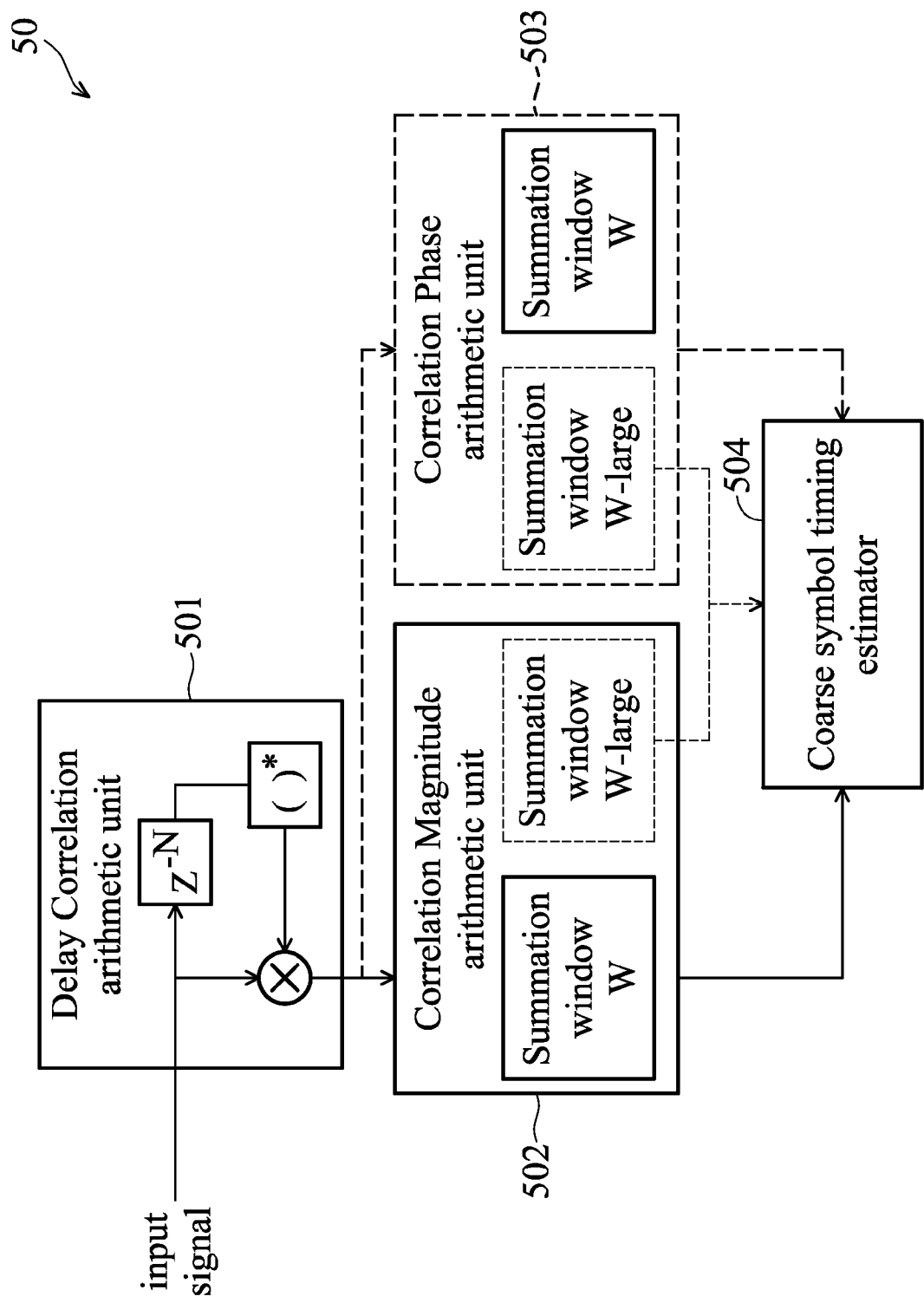
FIG. 3 illustrates a coarse symbol timing module 50 for an Orthogonal Frequency Division Multiplexing (OFDM) system according to an embodiment of the present application.

FIG. 3 illustrates a coarse symbol timing module 50 for an Orthogonal Frequency Division Multiplexing (OFDM) system according to an embodiment of the present application. The Orthogonal Frequency Division Multiplexing (OFDM) system is also defined as a multi-carrier system. Delay Correlation arithmetic unit 501 that receives an Nth input symbol and executes a delay correlation operation for the received Nth input symbol to generate and output a plurality of delay correlation values. The first step of the delay correlation operation is to delay the received Nth input symbol for a period of an input symbol to generate an Nth delayed input symbol, and the second step of the delay correlation operation is to conjugate the Nth delayed input symbol in order to obtain the conjugate complex numbers of the Nth delayed input symbol, for example: the conjugate complex number of 1+2j is 1−2j. The third step of the delay correlation operation is to multiple the values in the position of the Nth input symbol by the values in the corresponding position of the Nth input delayed symbol via a one-to-one manner in order to generate a plurality of delay correlation values. The Correlation Magnitude arithmetic unit 502 (a real line in the FIG. 3) first takes out the magnitude data of the delay correlation values, and then the magnitude data is summed by using the summation window with a size smaller than the duplicated data. The magnitude characteristic signal is generated after the summed magnitude data is normalized. Specifically, the magnitude characteristic signal is generated by using the summation window with a size smaller than the duplicated data to execute a correlation magnitude operation, such as the magnitude characteristic signal in the FIGS. 4-1 and FIG. 4-2. In addition, the characteristic signal is obtained by using the Correlation Phase arithmetic unit 503 (a longer dotted line in the FIG. 3). The Correlation Phase arithmetic unit 503 takes out the phase data of the delay correlation values, and then the phase difference data is generated by subtracting the following phase data from the former phase data. The required data is the absolute of the phase difference data, and the required data is summed by using the summation window with a size smaller than the duplicated data to generate a phase characteristic signal. Specifically, the phase characteristic signal is generated by using the summation window with a size smaller than the duplicated data to execute a correlation phase operation. The graph of the generated phase characteristic signal is similar to the magnitude characteristic signal, but the graphs between the phase characteristic signal and the magnitude characteristic signal looks like opposites. For example the position associated with the data in the magnitude characteristic signal is in the convex of the magnitude characteristic signal. On the contrary, the position associated with the data in the phase characteristic signal is in the concave of the phase characteristic signal. In addition, the graph of magnitude characteristic signal rises, but the graph of phase characteristic signal declines. The coarse symbol timing estimator 504 only needs the magnitude characteristic signal generated by Correlation Magnitude arithmetic unit 502 or the phase characteristic signal generated by Correlation Phase arithmetic unit 503 to determine the required coarse symbol timing position. The coarse symbol timing estimator 504 first determines a search region according to a predetermined threshold and one of the magnitude characteristic signal generated by the Correlation Magnitude arithmetic unit 502 and the phase characteristic signal generated by the Correlation Phase arithmetic unit 503, and searches a local peak value in the search region. For example, the coarse symbol timing estimator 504 determines a search region according to a predetermined threshold and the magnitude characteristic signal, and then searches a local maximum value in the search region. On the contrary, the coarse symbol timing estimator 504 determines a search region according to a predetermined threshold and the phase characteristic signal, and then searches a local minimum value in the search region, as shown in the FIG. 5. Therefore, the coarse symbol timing estimator 504 determines a position of a right edge point in the right edge of the magnitude characteristic signal or the phase characteristic signal according to a difference value and the searched local peak value, wherein the predetermined threshold is defined as one-half of a local peak value or less than one-half of a local peak value and the difference value is defined as one-half or a quarter of the local peak value or less than one-half or a quarter of the local peak value. The coarse symbol timing estimator 504 then obtains a coarse symbol timing position according to a predetermined movement T-GIL-s and the right edge point, wherein T is the period of the input symbol, GIL is the length of the duplicated data, and s is the set value. The set value "s" is larger than 0 and not larger than the size of the summation window. Therefore, the coarse symbol timing position obtained from the data in the Nth input symbol is provided to the (N+2)th input symbol for timing synchronization.

Figures 1, 4:
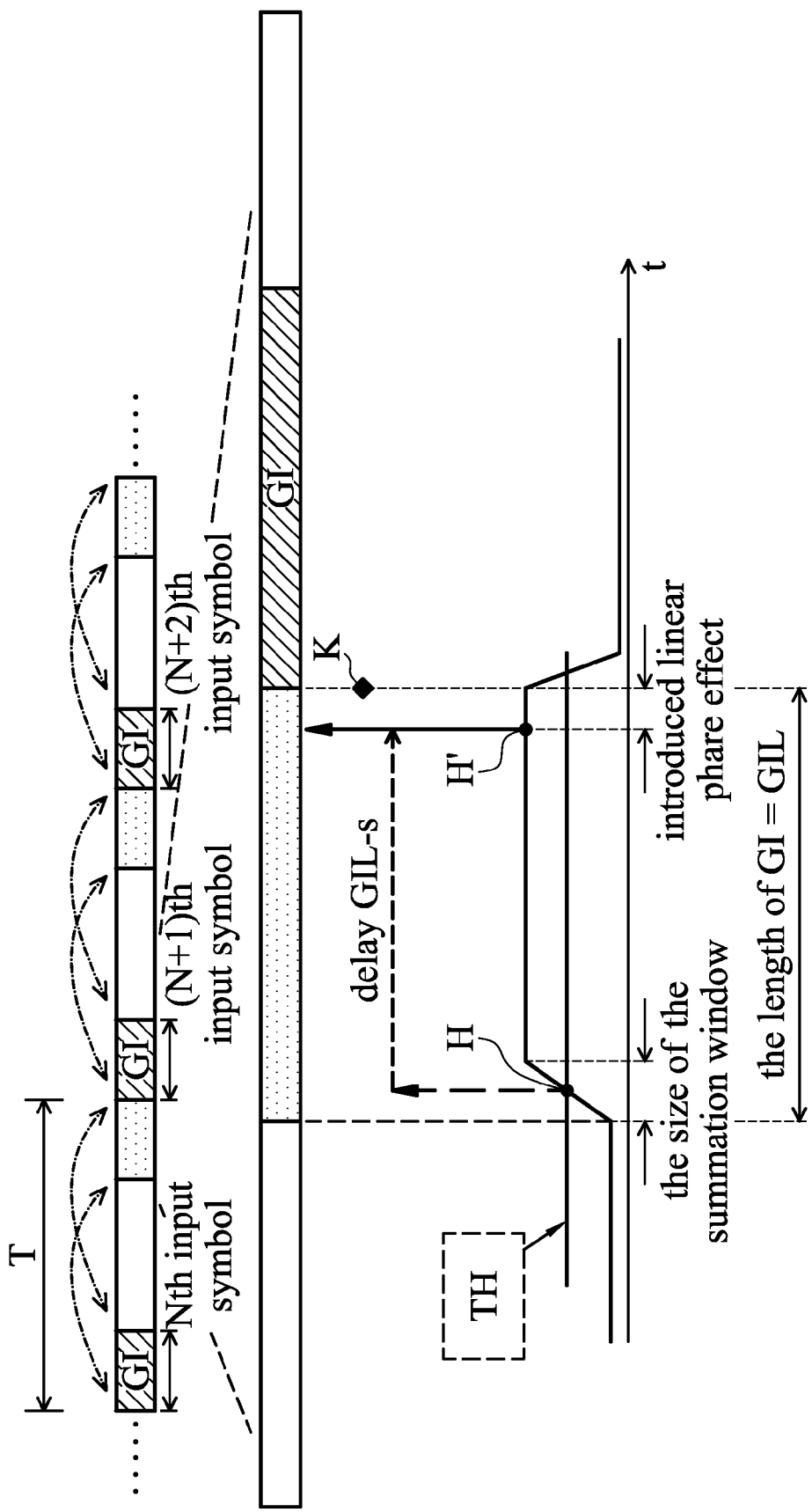
Figures 2, 4:
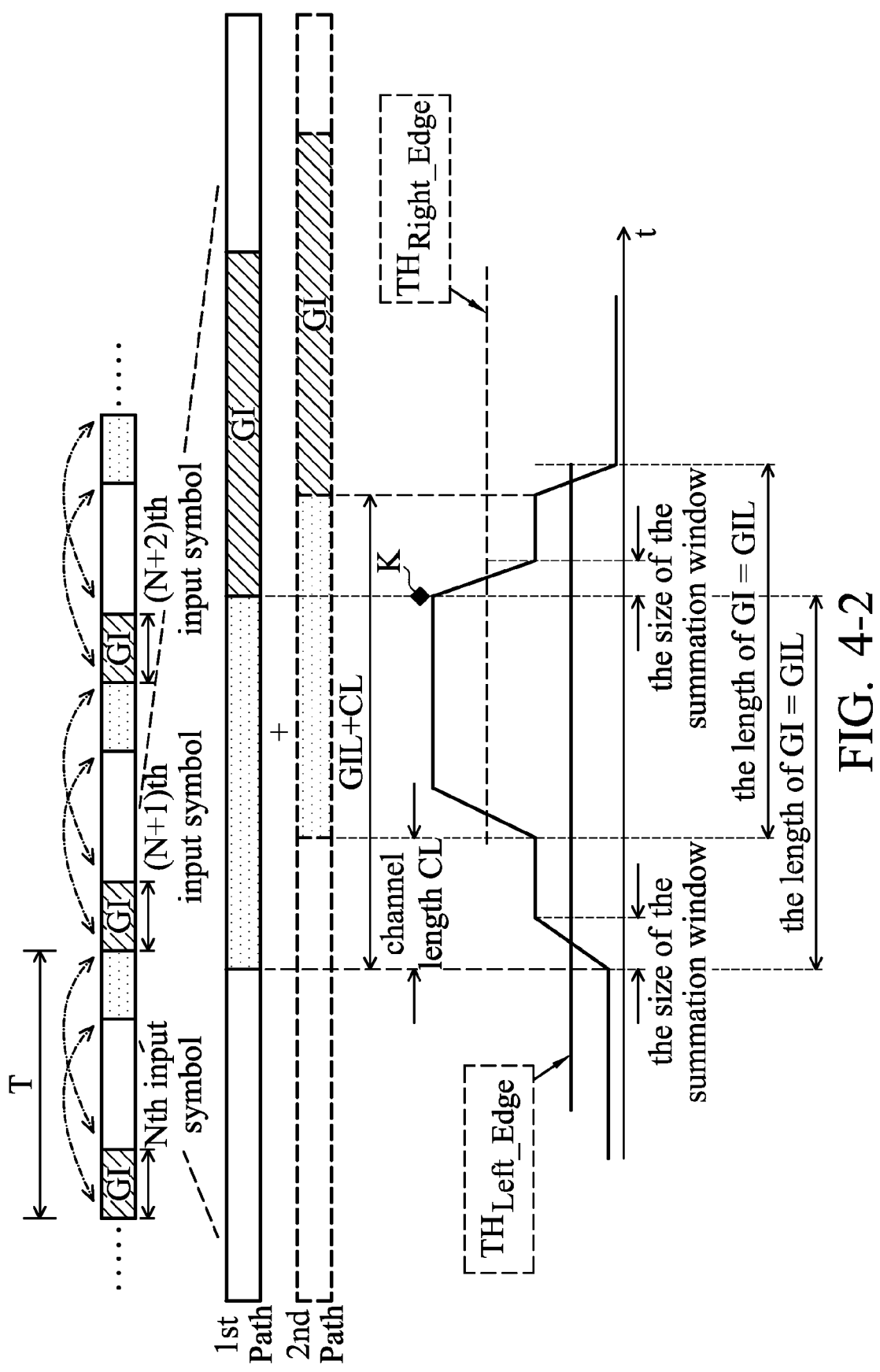

In addition, the coarse symbol timing estimator 504 also determines a coarse symbol timing position from the left edge of the characteristic signal. A cross point of the selected predetermined threshold "TH" and the left edge of the characteristic signal is a left edge point "H", and then the left edge point "H" is shifted by a predetermined movement GIL-s according to the left edge point "H" and the predetermined movement GIL-s in order to obtain the coarse symbol timing position "H'". The coarse symbol timing position"H'" is very close to an ideal coarse symbol timing position "K", as shown in FIG. 4-1. Therefore, the obtained coarse symbol timing position is provided to the (N+2)th input symbol for timing synchronization. It is noteworthy that the left edge point "H" is shifted by a predetermined movement GIL-s to generate the point "H'", wherein s is a pre-defined set value and the value of the set value "s" may have an effect on the distance between the point "H'" and the ideal coarse symbol timing position "K". The linear phase effect is introduced when the selected coarse symbol timing position is far from the ideal coarse symbol timing position "K", hence the introduced linear phase effect should be avoided.

The coarse symbol timing estimator 504 outputs the coarse symbol timing position to a signal transformation module 70. The part of the shorter dotted line in the FIG. 3 is an optional function and is particularly described in the FIG. 7.

FIG. 4-1 illustrates a schematic diagram of a magnitude characteristic signal generated by using a summation window with a size smaller than a duplicated data to execute a correlation operation in a short channel according to an embodiment of the present application and FIG. 4-2 illustrates a schematic diagram of a magnitude characteristic signal generated by using a summation window with a size smaller than a duplicated data to execute a correlation operation in a long channel according to an embodiment of the present application. For example, an additive white Gaussian noise (AWGN), a Rayleigh fading channel, a Rician fading Channel and a TU6 Channel belong to the short channel, and an echo channel belongs to the long channel etc. Because of using a summation window with a size smaller than a duplicated data to execute a correlation operation, the obtained characteristic signal has a numerical size limit. For example, the obtained characteristic signal has a gradual region where the local peak value is in, such as the gradual region of the FIG. 4-1. Referring to the FIG. 4-2, the predetermined threshold depends on the right or left edge in a long channel (eg. echo channel). The predetermined threshold in the right edge of the magnitude characteristic signal (defined as $TH_{Right\_Edge}$) is larger than the predetermined threshold in the left edge of the magnitude characteristic signal (defined as $TH_{Left\_Edge}$). But in the phase characteristic signal, the above described condition is reversed. However, the predetermined threshold does not depend on the right or left edge in a short channel.

Figure 5:
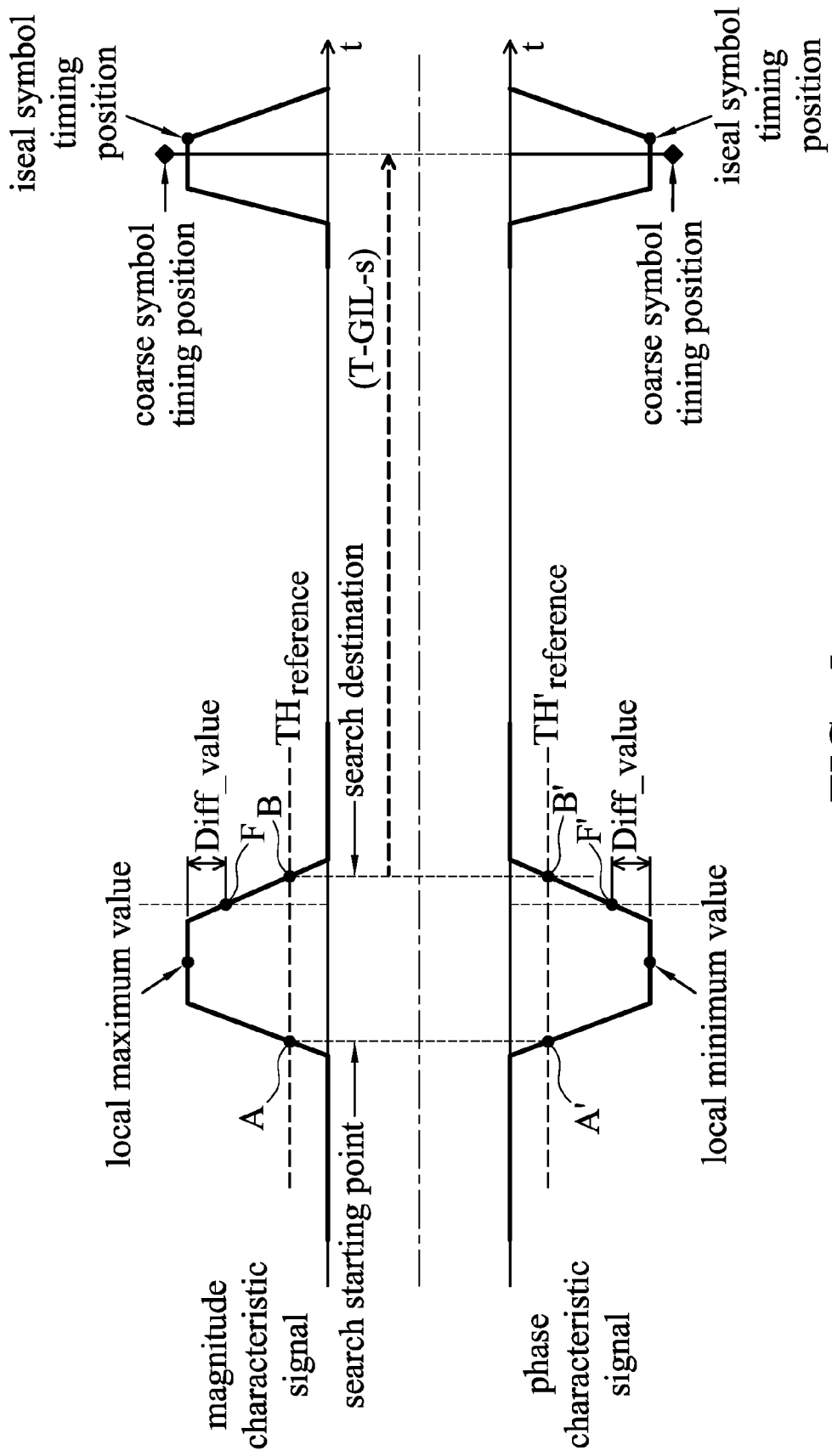
FIG. 5 illustrates a schematic diagram of a method for determining the right edge point in the characteristic signal according to an embodiment of the present application.

FIG. 5 illustrates a schematic diagram of a method for determining the right edge point in the characteristic signal according to an embodiment of the present application. A search region is determined according to a predetermined threshold and one of the magnitude characteristic signal generated by the Correlation Magnitude arithmetic unit 502 and the phase characteristic signal generated by Correlation Phase arithmetic unit 503. The search region is the region between the two cross point of the predetermined threshold and the magnitude characteristic signal or the predetermined threshold and the phase characteristic signal. Referring to the FIG. 5, the search region is the region between the two cross point A and B of the predetermined threshold "$TH_{reference}$" and the magnitude characteristic signal, wherein A is a search starting point and B is a search destination.

The local peak value in the characteristic signal then is searched from the search region. For example, the local maximum value is searched from the region between the two cross point A and B. The local maximum value which is determined from the region between A and B is a value in the gradual region of the magnitude characteristic signal, as shown in FIG. 5. The position of the right edge point in the magnitude characteristic signal is determined to be along the right edge of the magnitude characteristic signal after the local maximum value has been searched, wherein right edge point in the magnitude characteristic signal is the point where a difference between a value of the point in the right edge of the magnitude characteristic signal and the local maximum value is equal to the difference value "Diff_value". Then the position of the right edge point is right shifted by a predetermined movement T-GIL-s to generate a coarse symbol timing position which is provided to the following input symbol for timing synchronization.

In another example, the search region is defined as the region between the two cross point A' and B' of the predetermined threshold "$TH'_{reference}$" and the phase characteristic signal, wherein A' is a search starting point, B' is a search destination, and the predetermined threshold "$TH'_{reference}$" is defined as the one-half of a local peak value or less than the one-half of a local peak value. The local peak value is searched from the search region. For example, the local minimum value is searched from the search between the two cross point A' and B'. The local minimum value which is determined from the region between A' and B' is a value in the gradual region of the phase characteristic signal, as shown in FIG. 5. The position of the right edge point in the phase characteristic signal is determined to be along the right edge of the phase characteristic signal after the local minimum value has been searched, wherein right edge point in the phase characteristic signal is the point where a difference between a value of the point in the right edge of the phase characteristic signal and the local minimum value is equal to the difference value "Diff_value". Then the position of the right edge point is right shifted by a predetermined movement T-GIL-s to generate a coarse symbol timing position.

Figure 6:
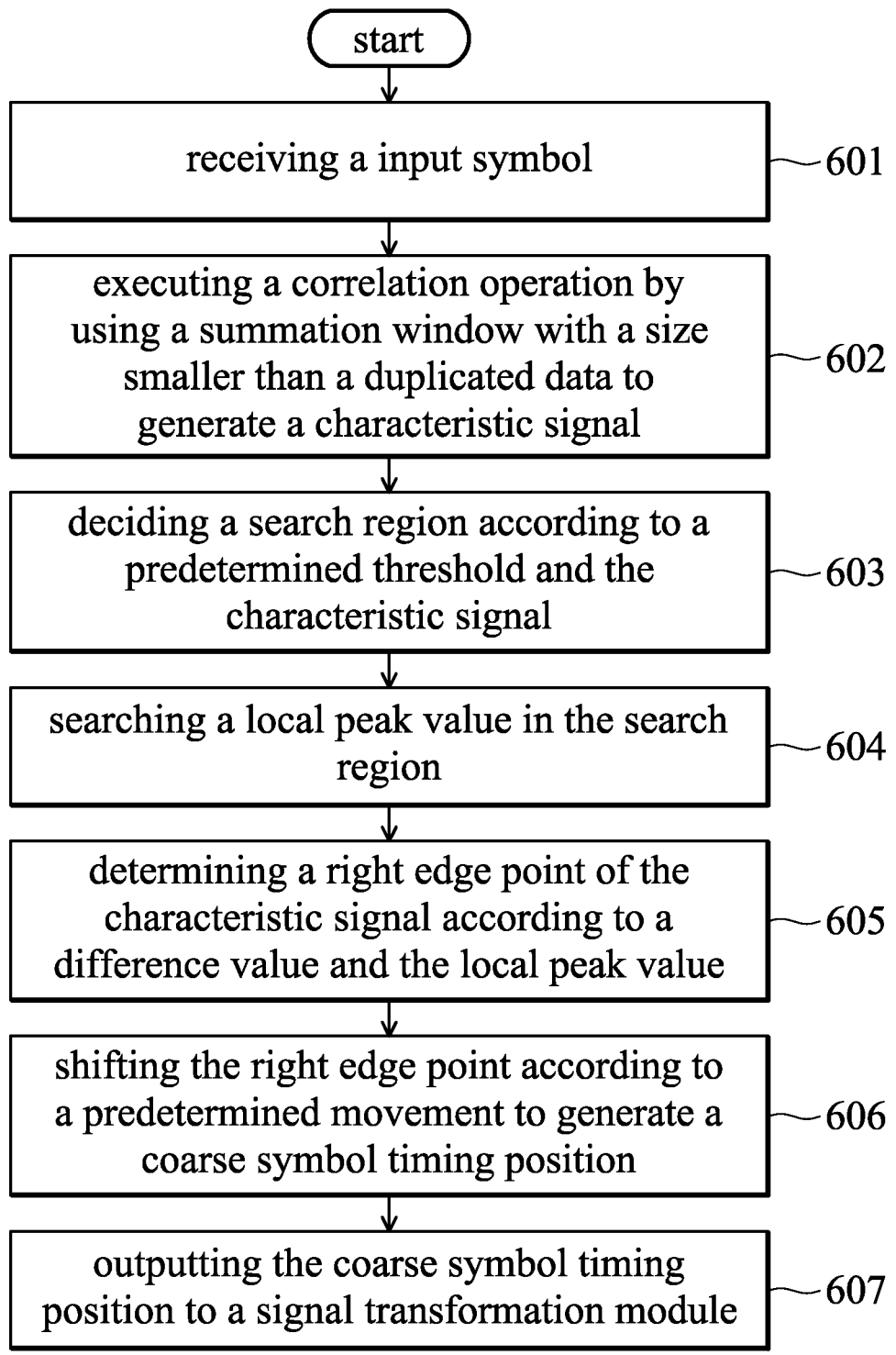
FIG. 6 illustrates a flow chat of a coarse symbol timing method according to an embodiment of the present application.

FIG. 6 illustrates a flow chat of a coarse symbol timing method according to an embodiment of the present application. In a beginning, an input symbol is received in the step 601. In the step 602, a characteristic signal is generated by using a summation window with a size smaller than the duplicated data for the input symbol to execute a correlation operation. A search region is determined according to a predetermined threshold and the characteristic signal, and a local peak value is searched in the search region in the step 604. In the step 605, a right edge point of the characteristic signal is determined according to a difference value and the searched local peak value. The right edge point is right shifted by a predetermined movement according to the predetermined movement to generate a coarse symbol timing position in the step 606. The determined position above is a coarse symbol timing position for a following input symbol. In the step 607, the coarse symbol timing position is outputted to a signal transformation module and the signal transformation is executed according to the coarse symbol timing position by the signal transformation module.

Figure 7:
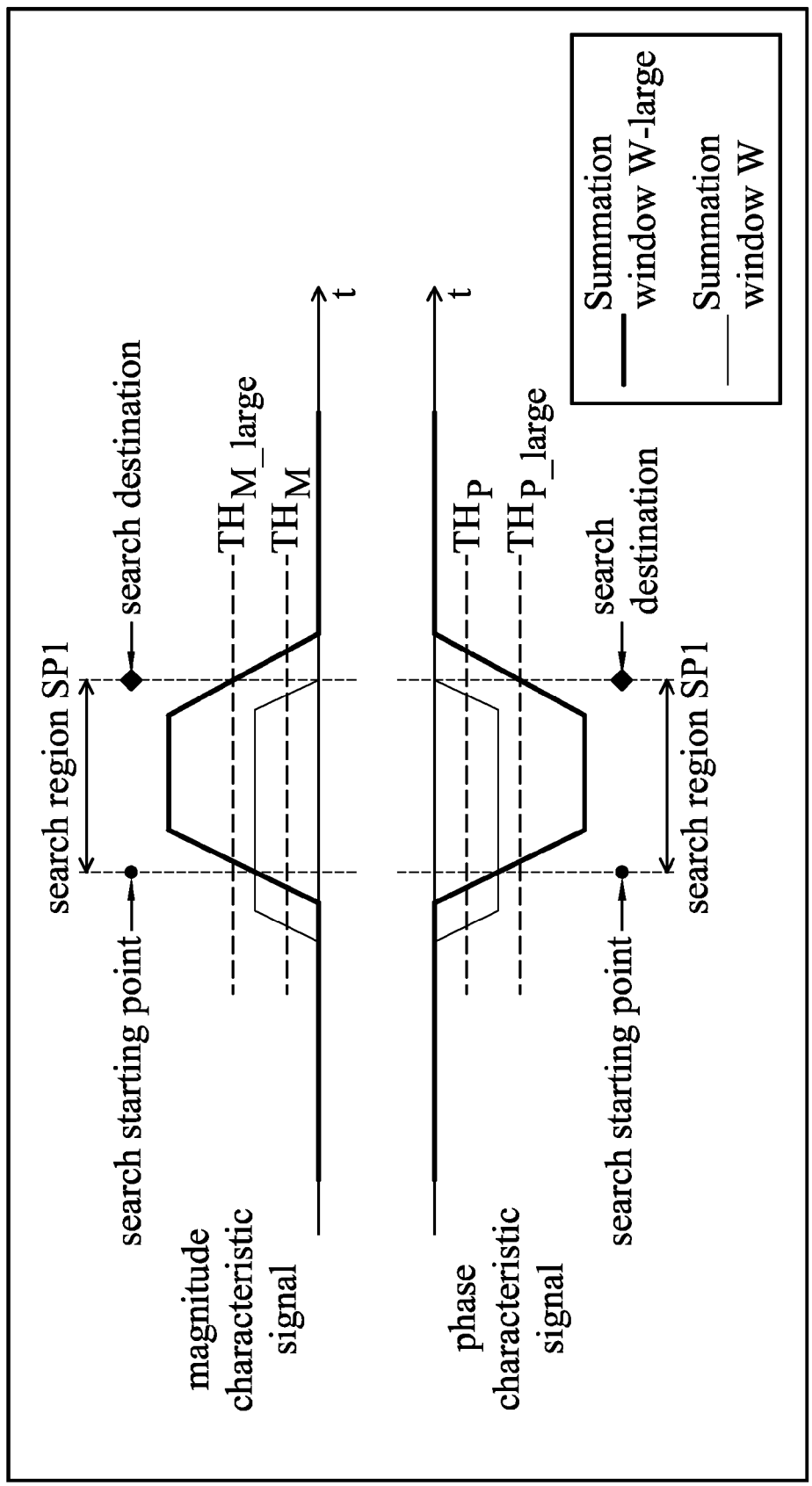
FIG. 7 illustrates a method for decreasing the search region according to an embodiment of the present application (optional function as shown in the FIG. 3).

FIG. 7 illustrates a method for decreasing the search region according to an embodiment of the present application (optional function as shown in the FIG. 3). A characteristic signal "CS1" is generated by using a summation window "W_large" with a larger size but still smaller than the duplicated data to execute a correlation operation, such as characteristic signal with the black line in the FIG. 7. A search region "SP1" is determined according to a predetermined larger threshold "$TH_{M\_large}$" and the magnitude characteristic signal or according to a predetermined larger threshold "$TH_{P\_large}$" and the phase signal. For example, the required search region is between the two cross points of the magnitude characteristic signal and the predetermined larger threshold "$TH_{M\_large}$". Within the search region "SP1", a characteristic signal "CS2" is then generated by using a summation window "W" with a size smaller than the above summation window "W_large" to execute a correlation operation, such as characteristic signal shown with the gray line in the FIG. 7. Note that the position of the characteristic signal "CS2" will be left shifted and the highest height in the graph of the position of the characteristic signal "CS2" is smaller when compared to the characteristic signal "CS1". A search region "SP2" is determined according to the characteristic signal "CS2" and a predetermined threshold "$TH_M$" or a predetermined threshold "$TH_P$", wherein the predetermined threshold "$TH_M$" is not larger than the predetermined larger threshold "$TH_{M\_large}$" and the predetermined threshold "$TH_P$" is not larger than the predetermined larger threshold "$TH_{P\_large}$". A right edge point in the right edge of the characteristic signal is determined within the search region "SP2" and then the right edge point is right shifted by a predetermined movement T-GIL-s to generate a coarse symbol timing position, wherein W_large=W or W<W_large<=GIL, and TH<TH_large. Referring to the FIG. 7, the search region "SP2" must include the right edge of the characteristic signal "CS1" which was originally required during the search so that decision errors may be reduced.

With the example and explanations above, the features and spirit of the application are hopefully well described. Those skilled in the art will readily observe that numerous modifications and alterations of the embodiments may be made while retaining the teachings of the application. Accordingly, the above disclosure should be construed as limited only by the metes and bounds of the appended claims.

What is claimed is:

1. A symbol timing method for a multi-carrier system, comprising:
   receiving an input symbol;
   executing a correlation operation by using a first summation window with a size smaller than a duplicated data to generate a first characteristic signal;
   determining a first search region according to a first predetermined threshold and the first characteristic signal;
   searching a local peak value in the first search region;
   locating a right edge point of the first characteristic signal according to a difference value and the local peak value;
   obtaining a coarse symbol timing position from the input symbol to provide to a following input symbol according to a predetermined movement and the right edge point; and
   outputting the coarse symbol timing position to a signal transformation module, wherein signal transformation is executed by the signal transformation module according to the coarse symbol timing position.

2. The symbol timing method of claim 1, wherein the input symbol is an Nth input symbol and the following input symbol is an (N+2)th input symbol, wherein the (N+2)th input symbol is a second input symbol after the Nth input symbol.

3. The symbol timing method of claim 1, wherein the first characteristic signal, the local peak value, the right edge point and the coarse symbol timing position of the following input symbol are obtained by a coarse symbol timing module.

4. The symbol timing method of claim 1, wherein the duplicated data is regarded as a cyclic prefix (CP) or a guard interval (GI).

5. The symbol timing method of claim 1, wherein the first characteristic signal is generated by using the first summation window with a size smaller than the duplicated data for the input symbol to execute a correlation magnitude operation and the local peak value is a local maximum value in the first search region.

6. The symbol timing method of claim 1, wherein the first characteristic signal is generated by using the first summation window with the size smaller than the duplicated data for the input symbol to execute a correlation phase operation and the local peak value is a local minimum value in the first search region.

7. The symbol timing method of claim 1, wherein the predetermined movement is determined according to a period of the input symbol, the duplicated data and a set value, and the set value is larger than 0 and not larger than the size of the first summation window.

8. The symbol timing method of claim 7, wherein the predetermined movement is T-GIL-s, wherein T is the period of the input symbol, GIL is the length of the duplicated data, and s is the set value.

9. The symbol timing method of claim 1, wherein determining the first search region comprises:
   determining a second search region according to the first predetermined threshold and the first characteristic signal;
   using a second summation window with a size smaller than the duplicated data to execute the correlation operation to generate a second characteristic signal in the second search region; and
   determining the first search region according to a second predetermined threshold and the second characteristic signal, wherein the size of the first summation window is larger than the second summation window and the first predetermined threshold is larger than the second predetermined threshold.

10. The symbol timing method of claim 5, wherein the right edge point of the first characteristic signal is a point where a difference between a value of the first characteristic signal in the point and the local maximum value is equal to the difference value.

11. The symbol timing method of claim 6, wherein the right edge point of the first characteristic signal is a point where a difference between a value of the first characteristic signal in the point and the local minimum value is equal to the difference value.

12. A receiver for a multi-carrier system, comprising:
a signal arrangement device for receiving and processing an Orthogonal Frequency Division Multiplexing (OFDM) symbol to generate an input symbol;
a coarse symbol timing module for executing a correlation operation by using a first summation window with a size smaller than a duplicated data to generate a first characteristic signal, determining a right edge point of the first characteristic signal according to a first predetermined threshold, a difference value and the first characteristic signal and locating a coarse symbol timing position from the input symbol to provide to a following input symbol according to a predetermined movement and the right edge point; and
a signal transformation module for executing signal transformation according to the coarse symbol timing position.

13. The receiver of claim 12, wherein the coarse symbol timing module further comprises:
determining a first search region according to the first predetermined threshold and the first characteristic signal;
searching a local peak value in the first search region;
locating the right edge point of the first characteristic signal according to the difference value and the local peak value; and
obtaining the coarse symbol timing position for the following input symbol according to the predetermined movement and the right edge point.

14. The receiver of claim 12, wherein the signal transformation module further comprises:
a position controller for controlling a fast Fourier transform (FFT) window start position according to the obtained coarse symbol timing position by the coarse symbol timing module; and
a fast Fourier transform (FFT) device for executing the signal transformation to obtain original data transmitted by a transmitter according to the fast Fourier transform (FFT) window start position and the input symbol.

15. The receiver of claim 12, wherein the input symbol is an Nth input symbol and the following input symbol is an (N+2)th input symbol, wherein the (N+2)th input symbol is a second input symbol after the Nth input symbol.

16. The receiver of claim 13, wherein the first characteristic signal, the local peak value, the right edge point and the coarse symbol timing position for the following input symbol are obtained by the coarse symbol timing module.

17. The receiver of claim 12, wherein the duplicated data is regarded as a cyclic prefix (CP) or a guard interval (GI).

18. The receiver of claim 13, wherein the first characteristic signal obtained by the coarse symbol timing module is generated by using the first summation window with the size smaller than the duplicated data for the input symbol to execute a correlation magnitude operation and the local peak value is a local maximum value in the first search region.

19. The receiver of claim 13, wherein the first characteristic signal obtained by the coarse symbol timing module is generated by using the first summation window with the size smaller than the duplicated data for the input symbol to execute a correlation phase operation and the local peak value is a local minimum value in the first search region.

20. The receiver of claim 12, wherein the predetermined movement is determined according to a period of the input symbol, the duplicated data and a set value, and the set value is larger than 0 and not larger than the size of the first summation window.

21. The receiver of claim 20, wherein the predetermined movement is T-GIL-s, wherein T is the period of the input symbol, GIL is the length of the duplicated data, and s is the set value.

22. The receiver of claim 12, wherein the coarse symbol timing module further comprises:
determining a second search region according to the first predetermined threshold and the first characteristic signal;
using a second summation window with a size smaller than the duplicated data to execute the correlation operation to generate a second characteristic signal in the second search region; and
determining the first search region according to a second predetermined threshold and the second characteristic signal, wherein the size of the first summation window is larger than the second summation window and the first predetermined threshold is larger than the second predetermined threshold.

23. The receiver of claim 18, wherein the right edge point of the first characteristic signal is a point where a difference between a value of the first characteristic signal in the point and the local maximum value is equal to the difference value.

24. The receiver of claim 19, wherein the right edge point of the first characteristic signal is a point where a difference between a value of the first characteristic signal in the point and the local minimum value is equal to the difference value.

* * * * *